(12) United States Patent
Schrödinger

(10) Patent No.: US 7,620,331 B2
(45) Date of Patent: Nov. 17, 2009

(54) RECEIVER CIRCUIT HAVING AN OPTICAL RECEIVING DEVICE

(75) Inventor: Karl Schrödinger, Berlin (DE)

(73) Assignee: Finisar Corporation, Sunnyvale, CA (US)

(*) Notice: Subject to any disclaimer, the term of this patent is extended or adjusted under 35 U.S.C. 154(b) by 391 days.

(21) Appl. No.: 10/799,785

(22) Filed: Mar. 12, 2004

(65) Prior Publication Data

US 2005/0220459 A1    Oct. 6, 2005

(51) Int. Cl.
    H04B 10/06    (2006.01)
(52) U.S. Cl. .................. 398/202; 398/208; 398/209; 398/210; 398/212; 398/213
(58) Field of Classification Search ................ 398/136, 398/202–214, 157–164; 359/163, 189, 341; 250/214

See application file for complete search history.

(56) References Cited

U.S. PATENT DOCUMENTS

| | | | | |
|---|---|---|---|---|
| 4,481,676 A * | 11/1984 | Eumurian et al. | ........... | 398/136 |
| 5,202,553 A * | 4/1993 | Geller | ................ | 250/214 A |
| 6,069,731 A * | 5/2000 | Bayart | ................ | 359/341.41 |
| 6,362,911 B1 * | 3/2002 | Lee et al. | ................ | 398/208 |
| 7,092,644 B2 * | 8/2006 | Davidson | ................ | 398/202 |
| 2002/0135845 A1 * | 9/2002 | Robinson et al. | ........... | 359/189 |

FOREIGN PATENT DOCUMENTS

GB             402281 A        1/2004

OTHER PUBLICATIONS

Schild: "Amplifier Array for 12 Parallel 10 Gb/s Optical-Fiber Links Fabricated in a SiGe Production Technology", IEEE Radio Frequency Integrated Circuit Symposium, 2002, p. 89-92.*

Mullrich et al: "High-gain transimpedance amplifier in InP-based HBT technology for the receiver in 40 Gb/s optical-fiber TDM links", IEEE, 21st Annual Gallium Arsenide Integrated Circuit (GaAs Ic) Symposium, Monterey, CA, USA, 1999, p. 99-102.*

"Amplifier Array for 12 Parallel 10 Gb/s Optical-Fiber Links Fabricated in a SiGe Production Technology", A. Schild, H:-M. Rein, J. Müllrich, L. Altenhain, J. Blank and K. Shcrödinger, International Microwave Symposium, 2002, 4 pgs.

"High-Gain Transimpedance Amplifier in InP-Based HBT Technology for the Receiver in 40-Gb/s Optical-Fiber TDM Links", Jens Müllrich, Herbert Thurner, Ernst Müllner, Joseph F. Jensen, William E. Stanchina, M. Kardos and Hans-Martin Rein, IEEE Journal of Solid-State Circuits, vol. 35. No. 9. Sep. 2000, pp. 1260-1265.

(Continued)

Primary Examiner—Ken N Vanderpuye
Assistant Examiner—Li Liu
(74) Attorney, Agent, or Firm—Workman Nydegger

(57) ABSTRACT

The invention relates to a receiver circuit having an optical receiving device, a plurality of amplifiers that are connected to the receiving device, and circuit means or a control circuit for individually activating and deactivating the individual amplifiers. In this case, the amplifiers each differ from one another in at least one parameter such as gain, and only one amplifier is activated at a given point in time, while the other amplifiers are deactivated. The invention makes it possible to match the receiver circuit to widely varying transmission rates.

11 Claims, 2 Drawing Sheets

OTHER PUBLICATIONS

"High-Gain SiGe Transimpedance Amplifier Array for a 12×10 Gb/s Parallel Optical-Fiber Link", Alexander Schild, Hand-Martin Rein, Jens Müllrich, Lars Altenhain, Jürgen Blank and Karl Schrödinger, IEEE Journal of Solid State Circuits, vol. 38. No. 1, Jan. 2003. 6 pgs.

* cited by examiner

RECEIVER CIRCUIT HAVING AN OPTICAL RECEIVING DEVICE

FIELD OF THE INVENTION

The invention relates to a receiver circuit having an optical receiving device and having an amplifier which is connected downstream of the optical receiving device. The invention relates, in particular, to a receiver circuit having a transimpedance amplifier for optical transmission systems.

BACKGROUND OF THE INVENTION

Receiver circuits having an optical receiving device are known, in which light incident on the optical receiving device—for example light from an optical waveguide in an optical data transmission system—is detected by the optical receiving device, forming an electrical signal (for example a photocurrent), and the electrical signal is subsequently amplified by the downstream amplifier.

An optical receiver circuit having an optical receiving device and having a downstream amplifier is described, for example, in the article "High Gain Transimpedance Amplifier in InP-Based HBT Technology for the Receiver in 40 Gb/s Optical-Fiber TDM Links" (Jens. Müllrich, Herbert Thurner, Ernst Müllner, Joseph F. Jensen, Senior Member, IEEE, William E. Stanchina, Member, IEEE, M. Kardos, and Hans-Martin Rein, Senior Member, IEEE—IEEE Journal of Solid State Circuits, vol. 35, No. 9, September 2000, pages 1260 to 1265). At the input of this receiver circuit there is a differentially operated transimpedance amplifier, that is to say a differential amplifier, one input of which is connected to a photodiode as receiving device. The other input of the differentially operated transimpedance amplifier is connected to a DC amplifier which feeds a "correction current" into the differential amplifier for the purpose of offset correction of the photodiode's photocurrent.

The article by A. Schild et al.: "Amplifier Array for 12 Parallel 10 Gb/s Optical-Fiber Links Fabricated in a SiGe Production Technology", International Microwave Symposium 2002, describes, inter alia, the design of a transimpedance amplifier in a receiver circuit. A transimpedance amplifier of this type is furthermore described in A. Schild et al.: "High-Gain SiGe Transimpedance Amplifier Array for a 12×10 Gb/s Parallel Optical Fiber Link", IEEE Journal of Solid State Circuits, January 2003, Vol. 38, Number 1, pages 4-12.

The required bandwidth needs to be taken into account when determining an optimum gain value for a transimpedance amplifier. A high gain is possible when the bandwidth is narrow, whereas only a low gain can be achieved when the bandwidth is wide. This is due to the fact that, to a first approximation, the gain-bandwidth product (V*B) is approximately constant and is prescribed by the individual configuration of the receiver circuit.

Therefore, if a particular bandwidth has been prescribed or is at least to be achieved, the user can derive the maximum permissible gain therefrom. However, the gain of a transimpedance amplifier can be set only within a limited range. This also means that the gain can be optimized with respect to the bandwidth only within a limited range.

There is a need for receiver circuits which can also be optimally used for greatly varying transmission rates.

SUMMARY OF THE INVENTION

The invention provides a receiver circuit having: an optical receiving device, a plurality of amplifiers which are connected to the receiving device, and circuit means for individually activating and deactivating the individual amplifiers. In this case, the amplifiers each differ from one another in at least one parameter. Only one amplifier is ever activated at a given point in time, while the other amplifiers are deactivated.

The inventive solution makes it possible for optimum use to be made of the receiver circuit even in the case of greatly varying transmission rates (data rates). That amplifier which is most suited to amplifying the instantaneous bandwidth, or a bandwidth which is at least to be provided, is thus activated as a function of said bandwidth. Entire amplifiers are thus switched on and off. As a result, considerably greater bandwidth variation is possible than would be the case if measures were used within an amplifier in an attempt to change the bandwidth of the latter. The invention makes optimum optical sensitivity possible since a maximum gain can be set depending on the prescribed bandwidth or the bandwidth to be achieved.

The individual amplifiers differ from one another in at least one parameter. One parameter of this type is preferably the amplifier's gain which—on account of the approximate constancy of the gain-bandwidth product (V*B)—determines the amplifier's bandwidth. Owing to the Switchable amplifiers, the receiver circuit can be individually matched to transmission rates of, for example, 100 Mb/s (megabits per second), 1 Gb/s (gigabits per second) or 10 Gb/s.

A specific gain for an amplifier is established in a manner known per se by those skilled in the art, for instance by suitably dimensioning the transistors, other circuit elements and the currents, so that this will not be discussed any further.

A further advantage of the inventive receiver circuit resides in its optimum noise response. Current noise plays a particularly relevant part in an amplifier if, for example, a photodiode is used as the receiving device and a transimpedance amplifier is used as the amplifier. However, current noise generally becomes lower toward higher amplifier gains, with the result that when the optimum—that is to say maximum—gain is selected, the amplifier's current noise also decreases. It is generally true for other types of amplifier, too, that the signal-to-noise ratio improves when the gain is higher. The inventive selection of a suitable amplifier according to the respective bandwidth requirement thus makes it possible to achieve an optimum noise response of the receiver circuit.

In one preferred refinement of the invention, the amplifiers each have a connection for providing a supply voltage, and the circuit means switch the supply voltage on or off for the purpose of individually activating and deactivating the individual amplifiers for each amplifier. Switching over between the amplifiers is thus effected by correspondingly switching the amplifiers' supply voltage on and off. It is possible to switch the positive or negative supply voltage.

In a further preferred refinement, the amplifiers each have an input (connected to the receiving device) and an output, and the circuit means switch the input and/or the output on or off for the purpose of individually activating and deactivating the individual amplifiers for each amplifier. In this variant, switching over between the amplifiers is effected by correspondingly switching the amplifiers inputs and/or outputs on and off.

In a further preferred refinement, the amplifiers each have a current source, and the circuit means switch the current source on or off for the purpose of individually activating and deactivating the individual amplifiers for each amplifier. In this variant, switching over between the amplifiers' is effected by correspondingly switching the amplifiers' current source on and off. If an amplifier has a plurality of current sources, all the current sources in an amplifier are preferably switched on or off. Switching off the current source switches the corresponding amplifier to high impedance, and the latter is thus no longer effective.

In one advantageous refinement, the individual amplifiers in the receiver circuit are connected in parallel with one another. The switching means respectively activate one of the amplifiers which are arranged in parallel, while the other amplifiers are deactivated. However, it is alternatively also conceivable in principle for a plurality of amplifiers to be connected in series, each having bypass lines which can be connected and disconnected via the switching means and which, as it were, short-circuit the amplifiers which have not been activated so that, in turn, only one amplifier is ever activated at any given point in time.

The circuit means preferably have a multiplicity of switches which can be set individually and are, for example, MOS transistors. In this case, the circuit means may be adjusted via at least one control line. The circuit means are preferably adjusted by the user via corresponding control lines as a function of the bandwidth of the data stream.

By way of example, a circuit for automatically measuring the instantaneous bandwidth of the received signal is provided, and control signals are automatically applied to control lines as a function of the measured bandwidth in such a manner that one suitable amplifier is activated and the other amplifiers are deactivated.

The individual amplifiers are preferably monolithically integrated, together with the switching means, in a common chip to produce a compact unit which can be pretested.

BRIEF DESCRIPTION OF THE DRAWINGS

The invention is explained in more detail below using an exemplary embodiment and with reference to the figures, in which.

DESCRIPTION OF A PREFERRED EXEMPLARY EMBODIMENT

Figure 1:
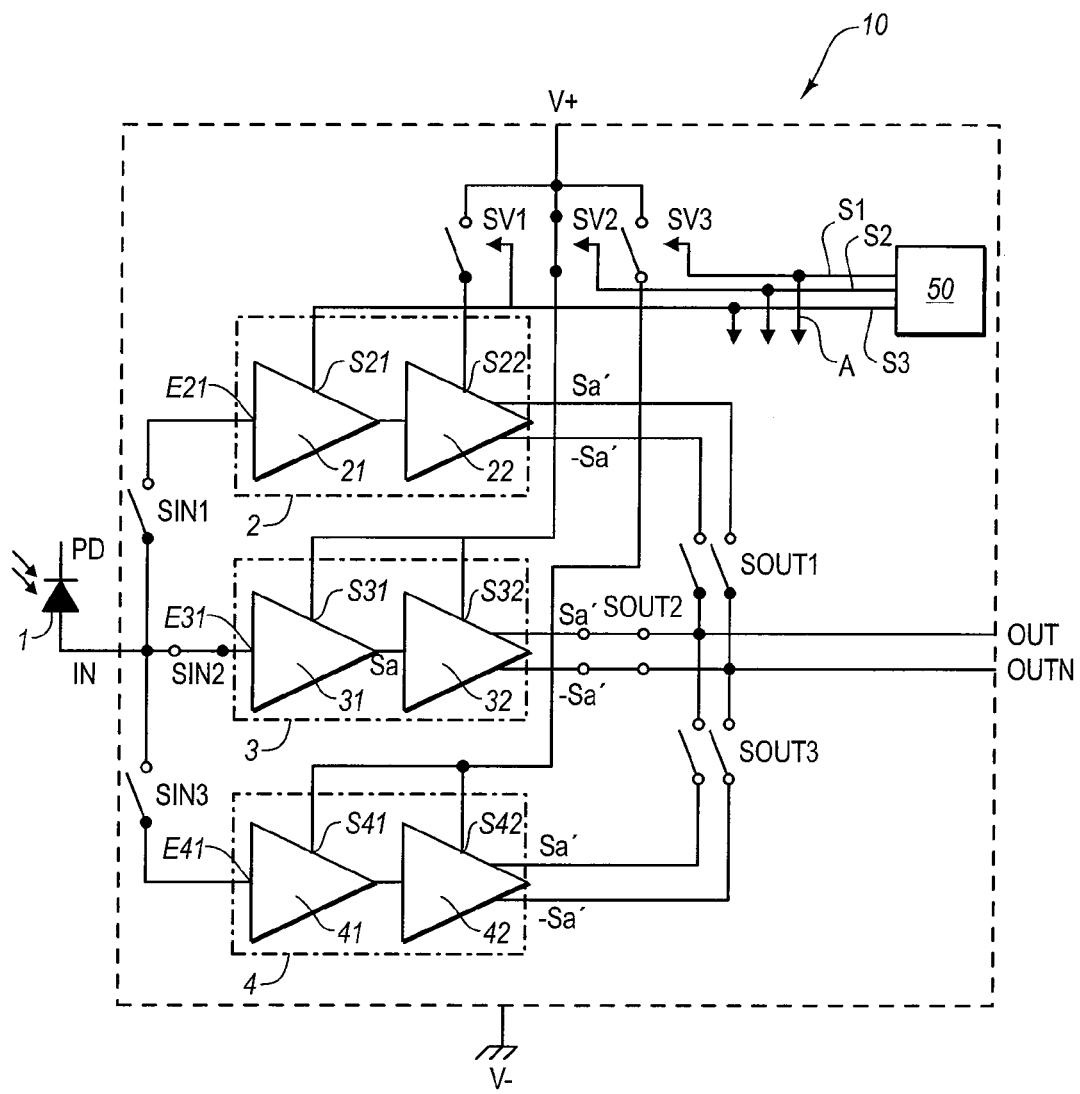
FIG. 1 shows an exemplary embodiment of a receiver circuit having an optical receiving device and a plurality of individual receiver circuits which are connected in parallel with one another.

FIG. 1 shows a receiver circuit 10 having a photodiode 1 as the optical receiving device and three downstream amplifiers 2, 3, 4 which are connected in parallel with one another, with only one of the amplifiers 2, 3, 4 ever being activated at a given point in time.

Before the design of the receiver circuit 10 having a plurality of amplifiers 2, 3, 4 is described in more detail, the design of an individual amplifier circuit and its method of operation will first of all be described using the middle amplifier circuit 3 by way of example.

The amplifier circuit 3 accordingly has two amplifier cells, namely an input amplifier 31 and an output amplifier 32. The input amplifier 31 is preferably in the form of a transimpedance amplifier and, in a manner known per se, comprises a voltage amplifier, for example an operational amplifier, and a feedback resistance. The feedback resistance is not shown separately in FIG. 1. The gain is determined by the so-called transimpedance, that is to say the ratio of output voltage to input current.

The output of the transimpedance amplifier 31 is connected to the output amplifier 32 which amplifies an output signal Sa from the transimpedance amplifier 31. The output amplifier 32 is preferably in the form of a differential amplifier. The signal can be amplified further by additional differential amplifiers which are arranged downstream of the differential amplifier 32. The output amplifier 32 thus symbolically represents an appropriate number of differential amplifiers.

The transimpedance amplifier 31 and the output amplifier 32 respectively have a connection S31, S32 for the positive supply voltage V+. A connection is likewise provided for the negative supply voltage V−, but has not been explicitly shown in order to improve the clarity of the illustration in FIG. 1.

The method of operation of the amplifier 3 is as follows. When light is incident, a photocurrent is generated by the photodiode 1 and fed into the transimpedance amplifier 31. The photocurrent is amplified therein to form the output signal Sa. The electrical output signal Sa is amplified further by the differential amplifier 32 to form an amplified differential output signal Sa', −Sa' and is passed to the output of the optical receiver circuit 10 where the signals are in the form of output signals OUT, OUTN. The output of the receiver circuit 10 is formed by the two outputs OUT, OUTN.

The additional amplifiers 2, 4 in the receiver circuit are in principle of the same design. However, by suitably selecting the transistors, the feedback resistances, the currents used etc., the amplifiers are different insofar as they each provide different gain values for the photocurrent of the photodiode 1.

A plurality of switches are now provided which cause only one of the amplifier circuits 2, 3, 4 to ever be activated at a given point in time, while the other circuits are deactivated.

Switching the supply voltage on and off constitutes a first option for activating and deactivating the individual amplifiers 2, 3, 4. Three circuits SV1, SV2, SV3 which can be used to switch the supply voltage for the respective amplifier cells 21, 22, 31, 32, 41, 42 are provided in the exemplary embodiment shown in FIG. 1. In the exemplary embodiment shown, the switch SV2 is closed, with the result that the positive supply voltage V+ is applied to the connections S31, S32 of the amplifier cells 31, 32 in the amplifier 3. In contrast, the switches SV1, SV3 are open, with the result that the amplifiers 2, 4 are deactivated. The switches SV1, SV2, SV3 are, for example, in the form of MOS transistors. Switching signals which each close or open the respective switch SV1, SV2, SV3 can be applied to the switches SV1, SV2, SV3 via control lines S1, S2, S3.

Corresponding switches may likewise also be provided in relation to the negative supply voltage. V− instead of in relation to the positive supply voltage V+, with the switches then each being connected between the negative supply voltage and the corresponding connection of the amplifier.

Switching the inputs E21, E31, E41 (which are connected to the photodiode 1) of the respective transimpedance amplifiers 21, 31, 41 in the amplifiers 2, 3, 4 constitutes a further option for activating and deactivating the amplifiers 2, 3, 4. To this end, switches SIN1, SIN2, SIN3 are respectively provided between the photodiode 1 and the respective inputs E21, E31, E41. In the exemplary embodiment shown, the switch SIN2 is closed, with the result that the amplifier 3 is activated. In contrast, the switches SIN1, SIN3 are open, with the result that the amplifiers 2, 4 are deactivated. Corresponding control signals are likewise applied to the switches SIN1, SIN3 by means of control lines S1, S2, S3, in which case, in order to improve the clarity of the illustration, the control lines S1, S2, S3 have not been routed as far as the corresponding switches SIN1, SIN2, SIN3 but rather this has merely been indicated by means of arrows A.

It is also possible, in a corresponding manner, to switch the outputs of the amplifiers 2, 3, 4. To this end, two switches SOUT1, SOUT2, SOUT3 are respectively provided which each connect the differential outputs of the amplifiers 2, 3, 4 (arranged in parallel with one another) to the two differential outputs OUT, OUTn of the receiver circuit 10. In this case too, the respective switches SOUT1, SOUT2, SOUT3 are in turn switched by the control lines S1, S2, S3.

It should be pointed out that, in the illustration in FIG. 1, it is possible to simultaneously activate and deactivate the individual amplifiers 2, 3, 4 both by switching the supply voltage and by switching the inputs and outputs. It suffices, of course, for only one of these options to be implemented in a practical embodiment. If, for particular reasons, a plurality of the options for activating and deactivating the individual amplifiers are simultaneously implemented, additional control lines may have to be provided.

Figure 2:
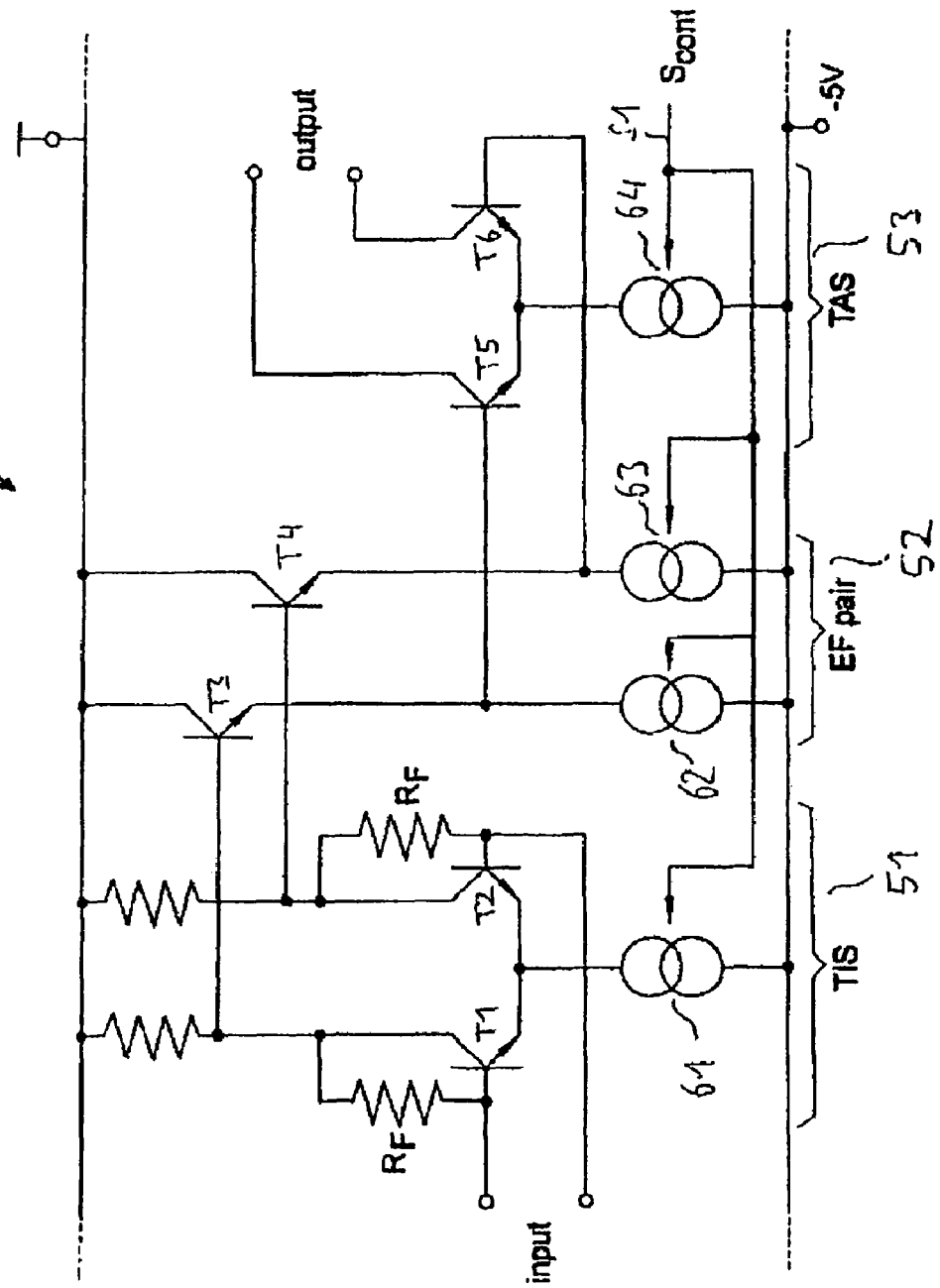
FIG. 2 shows an exemplary embodiment of an amplifier cell in an amplifier as shown in FIG. 1.

Provision may be made, as a further option for activating and deactivating the individual amplifiers 2, 3, 4, for switching over supply currents for the individual amplifiers 2, 3, 4. This is explained in more detail with reference to FIG. 2. FIG. 2 specifically shows the design of a transimpedance amplifier 5 corresponding to the transimpedance amplifiers 21, 31, 41 in FIG. 1. Said transimpedance amplifier 5 comprises three stages 51, 52, 53. The first stage 51 constitutes a transimpedance stage TIS, which has a differential amplifier (having two transistors T1, T2) and a bias current source 61. The two input connections of the transistors T1, T2 are, for example, directly connected to the two connections of the photodiode 1.

The second stage 52 comprises a pair of emitter followers T3, T4 and bias current sources 62, 63. The third stage 53 constitutes a transadmittance stage TAS having two further transistors T5, T6 and a bias current source 64. The third stage 53 constitutes a driver for the connection to a further amplifier cell. The amplifier 5 and amplifier cells shown in FIG. 2 are known per se to those skilled in the art, for example from the initially cited publications A. Schild et al.: "Amplifier Array for 12 Parallel 10 Gb/s Optical-Fiber Links Fabricated in a SiGe Production Technology", International Microwave Symposium 2002, and A. Schild et al.: "High-Gain SiGe Transimpedance Amplifier Array for a 12×10 Gb/s Parallel Optical Fiber Link", IEEE Journal of Solid State Circuits, January 2003, Vol. 38, Number 1, pages 4-12, the contents of which are each incorporated by reference in the present application.

As explained, the individual circuit parts have bias current sources 61, 62, 63, 64. The latter are formed, for example, by an MOSFET transistor. The individual current sources 61, 62, 63, 64 may be jointly switched via a control line S1 which can be used to apply a control signal $S_{CONT}$.

Switching off the bias current sources 61, 62, 63, 64 makes it possible to switch the respective amplifier stage to high impedance, with the result that the amplifier 5 is no longer effective. Switching over supply currents can thus also result in only one of the amplifiers 2, 3, 4 being activated.

The control lines S1, S2, S3 (cf. FIG. 1) are connected, for example, to a circuit 50 for recording the bandwidth of the signal which has been detected by the photodiode 1. In this case, suitable control signals are transmitted, via the control lines S1, S2, S3, to the existing switches in such a manner that only that amplifier 2, 3, 4 which is most suited to amplifying the measured bandwidth, or a bandwidth which is at least to be provided, is activated. In this case, the use of different amplifiers 2, 3, 4 which are switched on and off as a whole allows wide bandwidth variation.

The embodiment of the invention is not restricted to the exemplary embodiments which have been described above and should be understood merely as an example. Those skilled in the art will recognize that there are numerous alternative design variants which, despite differing from the exemplary embodiments described, make use of the teaching defined in the following claims.

The invention claimed is:

1. A receiver circuit, comprising:
 an optical receiving device configured to convert a received optical data signal into an electrical signal, and further configured to output the electrical signal;
 a plurality of amplifiers which are connected to the optical receiving device, wherein the plurality of amplifiers each include a supply voltage connection and at least a separate input amplifier stage and a separate output amplifier stage, wherein the input amplifier stages of the plurality of amplifiers are each coupled to the output of the optical receiving device wherein the individual amplifiers of the plurality of amplifiers are connected in parallel with one another, and wherein the input amplifier stages of the plurality of amplifiers are only coupled to the output amplifier stage of the same individual amplifier;
 a plurality of electrical switches arranged in parallel with each other, and each of the electrical switches being positioned between the optical receiving device and a respective amplifier;
 circuit means for individually activating and deactivating the individual amplifiers by regulating a supply voltage to each of the amplifiers or by controlling the electrical switches;
 a detecting circuit for detecting a bandwidth of the electrical signal which produced by the optical receiving device; and
 one or more control lines connecting the detecting circuit with the circuit means for individually activating and deactivating the individual amplifiers;
 wherein the detecting circuit is configured to provide control signals to the circuit means via the one or more control lines for activating the one of the plurality of amplifiers most suited to amplify the bandwidth of the electrical signal received by the detecting circuit;
 wherein the amplifiers each differ from one another in at least one parameter, and
 wherein the plurality of electrical switches enable the electrical signal from the optical receiving device to supplied to only one amplifier at a given point in time and enable supply of the electrical signal from the optical receiving device to the other amplifiers to be prevented at that given point in time.

2. The receiver circuit according to claim 1, wherein the amplifiers each have an input connected to the receiving device by way of one of the plurality of switches, and the amplifiers each have an output, and wherein the circuit means is operable to activate or deactivate each of the individual amplifiers by switching the output on or off.

3. The receiver circuit according to claim 1, wherein the amplifiers each comprise a transimpedance amplifier.

4. The receiver circuit according to claim 1, wherein the input amplifier stage and the output amplifier stage of the individual amplifiers of the plurality of amplifiers are connected in series.

5. The receiver circuit according to claim 4, wherein at least the input amplifier stage, that is connected to the receiving device comprises a transimpedance amplifier.

6. The receiver circuit according to claim 1, wherein the one parameter in which the individual amplifiers differ is the gain.

7. The receiver circuit according to claim 1, wherein the circuit means comprise a plurality of switches that are set individually.

8. The receiver circuit according to claim 7, wherein the individual switches comprise MOS transistors.

9. The receiver circuit according to claim 1, wherein the circuit means is adjusted via at least one control line.

10. The receiver circuit according to claim 1, wherein the receiving device comprises a photodiode.

11. The receiver circuit according to claim 1, wherein the individual amplifiers are monolithically integrated in a common chip.

* * * * *

UNITED STATES PATENT AND TRADEMARK OFFICE
CERTIFICATE OF CORRECTION

PATENT NO. : 7,620,331 B2
APPLICATION NO. : 10/799785
DATED : November 17, 2009
INVENTOR(S) : Karl Schrödinger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-sixth Day of October, 2010

David J. Kappos
*Director of the United States Patent and Trademark Office*